US010961478B1

(12) United States Patent
Wiley et al.

(10) Patent No.: US 10,961,478 B1
(45) Date of Patent: *Mar. 30, 2021

(54) METHODS AND APPARATUS FOR THE UTILIZATION OF TREATED CARBONACEOUS FUELS AND FEEDSTOCKS

(71) Applicant: VRC Technology, LLC, Centennial, CO (US)

(72) Inventors: Marcus A. Wiley, Highlands Ranch, CO (US); Matthew A. Cotton, Parker, CO (US); Darlene K. Sherrod, Parker, CO (US); Marcus K. Wiley, Parker, CO (US); Timothy P. Lenneman, Lakewood, CO (US); Thomas Kenyon Gale, Highlands Ranch, CO (US)

(73) Assignee: VRC Technology, LLC, Centennial, CO (US)

( * ) Notice: Subject to any disclaimer, the term of this patent is extended or adjusted under 35 U.S.C. 154(b) by 66 days.

This patent is subject to a terminal disclaimer.

(21) Appl. No.: 16/238,411

(22) Filed: Jan. 2, 2019

Related U.S. Application Data

(63) Continuation of application No. 15/633,635, filed on Jun. 26, 2017, now Pat. No. 10,202,558, which is a
(Continued)

(51) Int. Cl.
*C10L 10/02* (2006.01)
*F23K 1/00* (2006.01)
(Continued)

(52) U.S. Cl.
CPC ............. *C10L 10/02* (2013.01); *C10L 1/1208* (2013.01); *C10L 3/003* (2013.01); *C10L 5/366* (2013.01);
(Continued)

(58) Field of Classification Search
CPC ........ C10L 10/02; C10L 1/1208; C10L 5/366; C10L 3/003; C10L 2290/10; C10L 2290/02
(Continued)

(56) References Cited

U.S. PATENT DOCUMENTS

| 4,843,980 A | 7/1989 | Markham et al. |
| 5,499,105 A | 3/1996 | Baldrey et al. |

(Continued)

OTHER PUBLICATIONS

Understanding Mercury Chemistry in Coal-Fired Boilers: Biennial Report Dec. 2001-Dec. 2003, EPRI, Palo Alto, CA: 2003. 1008026.
(Continued)

*Primary Examiner* — Ellen M McAvoy
(74) *Attorney, Agent, or Firm* — Santangelo Law Offices, P.C.

(57) ABSTRACT

The inventive technology includes methods and apparatus for the generation and application of segregated catalytic additives for the pre-combustion treatment of carbonaceous fuel and/or feedstocks. The application of such segregated additives results in the reduction of environmentally harmful emissions during combustion as well as gasification processes. Specifically, pre-combustion treatment of carbonaceous materials with the inventive additives results in the reduction of NOx and/or mercury emissions by least 20% and 40% respectively.

22 Claims, 8 Drawing Sheets

Related U.S. Application Data continuation of application No. 14/611,000, filed on Jan. 30, 2015, now Pat. No. 9,688,935, which is a continuation of application No. 14/177,114, filed on Feb. 10, 2014, now Pat. No. 8,945,247.

(60) Provisional application No. 61/762,560, filed on Feb. 8, 2013.

(51) Int. Cl.
| | | |
|---|---|---|
| *C10L 1/12* | (2006.01) | |
| *C10L 5/36* | (2006.01) | |
| *C10L 3/00* | (2006.01) | |
| *F23J 7/00* | (2006.01) | |

(52) U.S. Cl.
CPC ............... *F23J 7/00* (2013.01); *F23K 1/00* (2013.01); *C10L 2200/02* (2013.01); *C10L 2290/02* (2013.01); *C10L 2290/10* (2013.01); *C10L 2300/30* (2013.01); *F23K 2201/505* (2013.01); *Y02E 20/32* (2013.01)

(58) Field of Classification Search
USPC .................................................. 44/620–627
See application file for complete search history.

(56) References Cited

U.S. PATENT DOCUMENTS

| | | | |
|---|---|---|---|
| 6,358,881 | B1 | 3/2002 | Peters et al. |
| 6,848,374 | B2 | 1/2005 | Srinivasachar |
| 6,902,665 | B2 | 6/2005 | Peters et al. |
| 7,648,170 | B2 | 1/2010 | Geslin et al. |
| 7,758,827 | B2 | 6/2010 | Comrie |
| 7,776,301 | B2 | 8/2010 | Comrie |
| 7,955,577 | B2 | 6/2011 | Comrie |
| 7,988,939 | B2 | 8/2011 | Comrie |
| 8,114,368 | B2 | 2/2012 | Comrie |
| 8,150,776 | B2 | 4/2012 | Comrie |
| 8,226,913 | B2 | 7/2012 | Comrie |
| 8,246,727 | B2 | 8/2012 | Comrie |
| 8,945,247 | B1 * | 2/2015 | Wiley ............... C10L 5/366 44/620 |
| 9,688,935 | B1 * | 6/2017 | Wiley ............... C10L 10/02 |
| 10,202,558 | B1 * | 2/2019 | Wiley ............... C10L 1/1208 |
| 2013/0032061 | A1 * | 2/2013 | Wilson ............... C10J 3/463 106/739 |

OTHER PUBLICATIONS

Siegart, W. R. et al, Texaco Coal Gasification Process: Commercial Plant Applications.
Power Systems and Environmental Research Department, Southern Research Institute, Pilot-Scale Test Results for San Juan Coal with San Juan Flyash, Jan. 23, 2013.
Radojevic, M and Harrison, R., Editors, Atmospheric Acidity; sources, consequences and abatement, Elsevier Science Publishers, Ltd. 1992.
Cox, L., et al., EPA Technical Bulletin, Nitrogen Oxides (NOx), why and how they are controlled, Prepared by Clean Air Technology Center, US Environmental Protection Agency, 1999.
Clark, P.D. et al., Catalytic Reduction of Nitric Oxide by Hydrogen Sulfide Over y-alumina; Catalysis Letters, vol. 104, Issue 1-2 , pp. 73-78, 2005.
Zhang, Y. et al., Determination of trace rare earth elements in coal fly ash and atmospheric particulates by electrothermal vaporization inductively coupled plasma mass spectrometry with slurry sampling, Environ Pollut. Jul. 2007;148(2):459-67. Epub Apr. 26, 2007.
Coal Fly Ash Remediation | AAERC; 2013 Appalachia America Energy Research Center; http://www.aaerc.org/technologies/coal-fly-ash-remediation/.
Simultaneous Control of Hg(O), SO(2), and NO(x) by novel Oxidized calcium-based Sorbents; Journal of the Air and Waste Management Association, Mar. 2002, vol. 52, Iss.3; p. 273.
U.S. Appl. No. 61/762,560, filed Feb. 8, 2013. First Named Inventor: Wiley.
U.S. Appl. No. 14/177,114, filed Feb. 10, 2014. First Named Inventor: Wiley.
U.S. Appl. No. 14/611,000, filed Jan. 30, 2015. First Named Inventor: Wiley.
U.S. Appl. No. 15/633,635, filed Jun. 26, 2017. First Named Inventor: Wiley.

* cited by examiner

| Compound | % by weight | Fly ash % | Limestone % | weight/ton | Range | Sub Range-1 | Sub Range-2 |
|---|---|---|---|---|---|---|---|
| Silicon Dioxide (SiO2) | 45.880% | 61.179% | | 4.59 | 20-65% | 40-50% | 44-46% |
| Aluminum Oxide (Al2O3) | 19.280% | 25.703% | | 1.93 | 5-35% | 15-25% | 18-21% |
| Iron Oxide (Fe2O3) | 3.040% | 4.057% | | 0.3 | .1-10% | 1-5% | 1-5% |
| Calcium Oxide (CaO) | 2.600% | 3.471% | | 0.26 | .1-10% | .5-5% | .2-4.6% |
| Magnesium Oxide (MgO) | 0.610% | 0.812% | | 0.06 | .1-10% | .1-1% | .1-2% |
| Potassium Oxide (K2O) | 1.010% | 1.347% | | 0.1 | .1-10% | .1-2% | .1-2% |
| Sodium Oxide (Na2O) | 1.270% | 1.693% | | 0.13 | .1-10% | .1-3% | .1-2% |
| Titanium Dioxide (TiO2) | 0.770% | 1.020% | | 0.08 | .1-10% | .1-2% | .1-2% |
| Sulfur Trioxide (SO3) | 0.270% | 0.365% | | 0.03 | .1-15% | .1-2% | .1-2% |
| Phosphorus Pentoxide (P2O5) | 0.120% | 0.157% | | 0.01 | .01-10% | .01-2% | .01-.05% |
| Strontium Oxide (SrO) | 0.050% | 0.072% | | 0.01 | .01-10% | .01-1% | .01-.05% |
| Barium Oxide (BaO) | 0.080% | 0.104% | | 0.01 | .01-10% | .01-1% | .01-.05% |
| Manganese Oxide (MnO) | 0.020% | 0.022% | | 0 | .01-10% | .01-1% | .01-.05% |
| Calcium Carbonate (CaCO3) | 24.250% | | 97.000% | 2.43 | 5-45% | 15-35% | 22-26% |
| Magnesium carbonate (MgCO3) | 0.500% | | 2.000% | 0.05 | .1-10% | .1-2% | .1-1% |
| Crystalline Silica (Si) | 0.080% | | 0.300% | 0.1 | .01-10% | 0.01-2% | 0.01-.5% |
| Other trace compounds | 0.170% | | 0.700% | 0.02 | .01-10% | .01-2% | .01-.5% |
| TOTAL | 100.00% | 100.00% | 100.00% | | | | |
| Particle Sizing | | 325 mesh (44 µM) | 325 mesh (44 µM) | | | | |
| Sizing Range | | 85µM-0.5µM | 85µM-0.5µM | | | | |
| Sizing Sub-Range1 | | 75-40µM | 75-40µM | | | | |
| Sizing Sub-Range2 | | 45-1µM | 45-1µM | | | | |
| Sizing Sub-Range3 | | 44 µM | 44 µM | | | | |

FIGURE 5

| Segregated Limestone % | Segregated Fly Ash % |
|---|---|
| 1 | 99 |
| 5 | 95 |
| 10 | 90 |
| 15 | 85 |
| 20 | 80 |
| 25 | 75 |
| 30 | 70 |
| 35 | 65 |
| 40 | 60 |
| 45 | 55 |
| 50 | 50 |
| 55 | 45 |
| 60 | 40 |
| 65 | 35 |
| 70 | 30 |
| 75 | 25 |
| 80 | 20 |
| 85 | 15 |
| 90 | 10 |
| 95 | 5 |
| 99 | 1 |

FIGURE 6

| Component | Bituminous | Subbituminous | Lignite |
|---|---|---|---|
| $SiO_2$ (%) | 20-60 | 40-60 | 15-45 |
| $Al_2O_3$ (%) | 5-35 | 20-30 | 20-25 |
| $Fe_2O_3$ (%) | 10-40 | 4-10 | 4-15 |
| CaO (%) | 1-12 | 5-30 | 15-40 |
| LOI (%) | 0-15 | 0-3 | 0-5 |

FIGURE 7

METHODS AND APPARATUS FOR THE UTILIZATION OF TREATED CARBONACEOUS FUELS AND FEEDSTOCKS

This application is a continuation application which claims the benefit of and priority to U.S. application Ser. No. 15/633,635, filed Jun. 26, 2017; which is a continuation of U.S. application Ser. No. 14/611,000, filed Jan. 30, 2015 and issued as U.S. Pat. No. 9,688,935 on Jun. 27, 2017; which is a continuation of U.S. application Ser. No. 14/177,114, filed Feb. 10, 2014 and issued as U.S. Pat. No. 8,945,247 on Feb. 3, 2015; which claims the benefit of and priority to U.S. provisional application No. 61/762,560 filed Feb. 8, 2013. The entirety of each of the above-mentioned applications are hereby incorporated by reference.

TECHNICAL FIELD

The inventive technology generally relates to the reduction of undesired emissions of harmful environmental chemical pollutants generated from the combustion and/or gasification of carbonaceous fuels and/or other feedstocks. The present invention in its various embodiments may include an improved system for the treatment of carbonaceous fuels and/or other feedstocks, such as coal, petroleum coke, biomass, petroleum, peat, residual oils and natural gas and the like. Such carbonaceous fuels and/or other feedstocks may be in liquid, solid or gas form. While a variety of carbonaceous fuels and/or other feedstocks are contemplated within the scope of the invention, reference to any specific fuel source is merely exemplary and in no way limiting.

As discussed herein, the inventive technology may provide for a more efficient combustion, and/or chemical interactions/reactions during the combustion and/or gasification process thereby causing a reduction of harmful chemical emissions from carbonaceous and/or other feedstock based facilities. More generally, the inventive technology may provide for techniques, systems, methods and apparatus that may include a pre-treatment of carbonaceous fuels and/or other feedstocks resulting in a reduction in the environmental release of harmful byproducts of their use, for example through combustion, pyrolysis and/or gasification and the like. The invention may be configured for use in combustion processes, such as coal combustion facilities as well as non-combustion processes such as gasification and/or pyrolysis.

Additional embodiments may specifically include processes that utilize combustion as well as non-combustion based systems such as gasification and the like. The invention may also be especially configured for application to pulverized coal furnaces/boiler, fluidized bed or cyclone boilers as well as liquid gas combustion systems and other carbonaceous fuel feedstock consumption or reformation systems such as in various gasification systems. The present invention may in some embodiments reduce, for example nitrogen oxides (NOx) (including, but not limited to NO, NO2, N2O as well as nitrite and nitrate compounds), and mercury species (Hg) (including, but not limited to elemental HG, Hg vapor, and oxidized Hg vapor and any other mercury containing compound) by at least 20% and 40% respectively. In addition, the invention may further reduce various sulfur oxides (SOx) (including, but not limited to SO, $SO_2$, $SO_3$, $SO_2$, $S_6O_2$, $S_2O_2$, sulfide and sulfate compounds as well as elemental sulfur) and other combustion and/or gasification emission byproducts in a manner that meets environmental threshold requirements.

In one specific embodiment, the inventive technology may include a method of generating a catalytically enhanced low emission carbonaceous fuel that produces less harmful environmental pollutants during combustion compared to non-treated carbonaceous materials. The processes disclosed herein being equally applicable to liquid carbonaceous material, solid carbonaceous material, and/or gas carbonaceous material. Additional aspects of the inventive technology may include the methods and apparatus for the improve yields of, and/or rate of carbonaceous fuel and/or feedstock consumption. Certain embodiments may include, methods of generating a low emission carbonaceous fuel additive that may be used, for example in the pre-combustion treatment of coal and the like. In still further embodiments, such carbonaceous fuel additive may be applied in situ at a point of production, such as a mine, during transport, storage or along multiple points of pre-combustion processing. Finally, embodiments of the invention may include methods of catalyzing the gasification of carbonaceous feedstock that increase select product gas components, as well as perhaps reduce harmful environmental pollutants generated during the gasification process.

BACKGROUND OF THE INVENTION

Enormous industrial and technical efforts have been exhausted with varying degrees of success grappling with the problem of environmental pollution generated from the processing of carbonaceous material. For example, the combustion of coal has provided the backbone of industrial and energy since the start of the industrial revolution. It is estimated that the world currently consumes over 4050 MT of coal per year. Such coal is utilized by a variety of sectors including: power generation; iron and steel production; cement manufacturing; and as a liquid fuel. For example, it is currently estimated that approximately 45% of all US electrical production is derived from coal combustion, while coal-fired power plants generate approximately 40-50% of global electricity. In some countries, coal generates an even higher percentage of electricity. For example, China produces approximately 80% of its electrical output from coal combustion, while South Africa generates over 90% of its total electricity from coal.

Despite renewed emphasis on alternative energy sources, with the existence of significant coal resources around the world capable of meeting large portions of the world's energy needs into the next two centuries, coal remains and will continue to be a core energy source. However, despite its prevalence, there exist various environmental and regulatory concerns, specifically related to the emission of harmful and unwanted chemical compounds generated from the combustion process. Apart from being one of the largest worldwide anthropogenic sources of carbon dioxide, coal combustion is a significant source of NOx, SOx and elemental as well as oxidized Hg and other heavy metals. (As described hereafter, carbonaceous material emissions may also be generally referred to as "Carbon Combustion by-Product's" (CCB's).) Such CCB emissions generally require remediation steps to prevent their release into the atmosphere upon combustion. For example, the emissions of SOx and NOx from U.S. power plants are regulated as part of Title IV of the Clean Air Act Amendments of 1990 (CAAA). (It should be noted that the purpose of this application, the term NOx generally encompasses all reactive compounds and/or gases which contain nitrogen and oxygen in varying amounts, such as nitrogen oxides. The term SOx generally encompasses all reactive compounds and/or gases which contain sulfur and oxygen in varying amounts, such as sulfur oxides. However, the terms NOx and SOX may also encompass any nitrogen or sulfur containing emission generated during the combustion, gasification or other processing method of carbonaceous materials respectively.)

As detailed below, such traditional systems are limited in their effectiveness as well as cost. Clearly an inexpensive, comprehensive solution to the aforementioned problems would represent a significant leap forward in the industry. One area of development is the use of additives that may facilitate non-formation and/or removal of emissions resulting from the consumption of carbonaceous and/or feedstock based processes as discussed above. By way of example, several U.S. patents have been issued relating to coal combustion byproduct removal. However, the present invention overcomes many of the operational and cost disadvantages associated with current processes involving pre-combustion additives. For example, past efforts to develop pre-combustion additives to coal, such as U.S. Pat. Nos. 7,988,939, 7,758,827 (Comrie references) and Zhao Yi, et al. reference each hereby incorporated by reference herein, have not afforded the various advantages and other combinations of features as presented herein. Indeed, in the prior art systems, disadvantages often exist that can create problems in a variety of areas.

For example, the Comrie references teach halogen based sorbents for coal combustion to facilitate Hg removal from the flue gas; however, such references rely on the addition of halogenated compounds, such as calcium-bromides to coal prior to combustion. Apart from being expensive, such halogenated compounds are also hazardous chemicals making their transport, use and disposal of limited desirability within the industry. Such, halogenated compounds further generally require additional remediation and disposal steps creating additional undesired cost and liabilities. For example, none of the Comrie references teach the use of segregated particulate matter, such as fly ash, and/or segregated calcium source compounds, such as limestone to achieve the synergistic catalytic removal or prevention of nitrogen, sulfur and Hg emissions resulting from coal combustion. In addition, the Comrie references are not applicable to other carbonaceous and/or feedstock based processes, such as gasification and the like. The use of these compounds may also cause slagging, fouling or corrosion of boiler tubes in a combustion furnace.

In another limited example, the Zhao Yi, et al. reference is also limiting as it uses lime as a sorbent to effectuate desulfurization and denitrification. However, use of hydrated lime as an additive is practically and commercially limited. Apart from the obvious undesirable caustic chemical profile of using such hydrated lime species, such as calcium hydroxide, such calcium sources are generally more expensive further limiting their usefulness. In addition, the Zhao Yi, et al. reference fails to provide optimal surface area understanding to any pre-combustion additives as well as their addition to a combustible fuel source reducing their actual effectiveness and preventing some functioning. Again, the Zhao Yi, et al. reference is not applicable to other carbonaceous and/or feedstock based processes, such as gasification and/or partial oxidation gasifying reactor systems (PDX).

One exemplary application of the inventive technology may include the treatment of carbonaceous materials such as coal to generate a catalytically enhanced low emission carbonaceous fuel. In one embodiment, the invention provides compositions and methods for reducing emissions of NOx, SOx and Hg among others CCB's that arise from the combustion of coal. In particular, coal burning facilities such as those used by electrical utilities may be used as one exemplary model of the current invention. In a preferred embodiment, for example a typical pulverized coal-fired facility may be appropriate for the current invention. In a typical pulverized coal fired facility, coal may be combusted in an atmospheric air combustion environment, additionally in an oxygen-fired facility, coal is combusted in an enriched oxygen environment by using pure oxygen diluted with combustion air or gas or perhaps flue gas (Hot/Cold RFG).

Again, as shown in FIG. 1, flue gas (FG), which may be a combination of combustion gases, air and various particulate matter such as fly ash may be shunted through a convection pathway where heat may be removed from the flue gases. It should be noted that, as shown in FIG. 2, such a convection pathway is generally characterized by a plurality of "heat" zones characterized by the temperature of the gases and combustion products in each zone with greater temperatures nearer the combustion event and falling generally downstream. As noted in FIG. 1, such a convective pathway may contain a variety of combustion gases, perhaps containing NOx, SOx and Hg species as well as particulate matter such as fly ash and other constituents moving away from the combustion event. In typical conventional systems as shown in FIG. 2 below, this flue gas may undergo various post-combustion treatments, such as chemical scrubbers. Post-combustion sorbant injections may be applied to the flue gas to remove undesired chemical constituents and the like prior to environmental release.

For example, again as shown in FIG. 2, typical post-combustion flue-gas treatments may include post-combustion selective catalytic reaction (SRC) treatment, traditional sorbent injection, and post-combustion flue gas desulfurization (FGD). In addition, as shown generally in FIGS. 2-3, further along in the convective pathway, the flue gas and fly ash may pass through lower temperature zones until a baghouse or electrostatic precipitator is reached before the gases may be emitted to the stack. In the US, typical remediation steps generally need to be accomplished prior to environmental release of the flue gas through the stack.

As an initial matter, coal-fired power plants generate steam produced in a boiler which is further used to generate electricity. In a steam boiler, water is heated under pressure to produce high-temperature and high pressure steam, which then passes through a steam turbine that spins an electric generator. The heat required to produce steam is obtained by burning coal. As noted above, flue gas formed after burning the coal contains hazardous emissions which are typically treated with pollutant control devices placed after combustion. There are a number of traditional post-combustion remediation methods.

Mercury speciation may have a strong impact on its capture by air pollution control techniques. Depending on the flue gas conditions Hg may be present in the flue gas as elemental mercury vapor ($Hg^0$), as an oxidized mercury species ($Hg^{2+}$), and as particulate-bound mercury ($Hg^p$). Elemental Hg, released into the exhaust gas, can then be oxidized to $Hg^{2+}$ via homogeneous and heterogeneous oxidation reactions. Among these Hg species, $Hg^0$ may be difficult to capture due to its insolubility in water, high volatility and chemical inertness. Different control technologies such as filters, desulfuration units and sorbent injection can be applied to decrease Hg emissions. As one example, mercury is at least partially volatilized upon combustion of coal. As a result, the mercury tends not to stay with the ash, but rather becomes a component of the flue gases. If remediation is not undertaken, the mercury tends to escape from the coal burning facility into the surrounding atmosphere. Depending on the type of coal combusted and Hg speciation, Hg removal efficiency can show significant variation making it difficult to find a consistent Hg removal technology for different types of coal burned in different types of boilers or furnaces or other fuels or fuel uses whether combustion or not.

Two common mercury removal technologies are the addition of scrubbers and carbon injection. However, each of these methods has significant technical and economical drawbacks that limit their effectiveness. In a typical carbon injection remediation process activated carbon is injected into the flue gas stream to adsorb mercury before it exits the stack. While this approach may reduce mercury emissions, it can also produce a significant amount of solid potentially hazardous waste. For example, the activated carbon systems may lead to carbon contamination of the fly ash collected in exhaust air treatments such as the bag house and electrostatic precipitators. Furthermore, since the fly ash may now contain activated carbon, it can no longer be useable in cement and/or concrete applications, one of the major post combustion utilization markets. Finally, use of such activated carbon systems tends to be associated with high treatment costs and elevated capital costs. As noted above, another typical Hg remedial technique involves the treatment of the flue gas with wet scrubber or Selective Catalytic Reduction (SCR) systems, However, again these approaches are also capital intensive—in materials and implementation—and further use hazardous materials such as anhydrous ammonia, and also produce undesired and perhaps hazardous waste products which must be disposed of, often at great expense. Moreover, the present invention may assist utilities in complying with new mercury emission regulations without the high capital equipment costs associated with current mercury remediation technologies.

Flue gas NOx emissions may be typically controlled by Selective Catalytic Reduction (SCR) systems processes. In an exemplary SCR process, ammonia ($NH_3$) reacts with NO and $NO_2$ gases such as on the catalyst surface and reduces to nitrogen ($N_2$) and water vapor ($H_2O$). Ammonia may be diluted with air or steam and this mixture may be injected into the flue gas upstream of a metal catalyst bed where it reacts with the flue gas. Oxides of vanadium, titanium, tungsten, or zeolites typically catalyze such as in the following reactions:

$$4NO+4NH_3+O_2 \rightarrow 4N_2+6H_2O$$

$$2NO_2+4NH_3+O_2 \rightarrow 3N_2+6H_2O$$

$$NO+NO_2+2NH_3 \rightarrow 2N_2+3H_2O$$

However, such methods of $NO_x$ reduction are again limited as such processes are typically expensive and require the use of, and also generate hazardous compounds/waste that may require further remediation and/or disposal. Again, the present invention may assist utilities in complying with new NOx regulations without the high capital equipment costs associated with current NOx remediation technologies.

In another remediation example, flue gas SOx removal systems may be generally separated into dry and wet removal systems depending on the particular coal's sulfur content. Plants burning low-sulfur coal typically use dry systems where lime and water are added to the flue gas and the following reactions occur:

$$CaO+H_2O \rightarrow Ca(OH)_2$$

$$Ca(OH)_2+SO_2 \rightarrow CaSO_3 \cdot \tfrac{1}{2}H_2O+\tfrac{1}{2}H_2O$$

Typically the solids formed from the $SO_2$ reaction may be captured by electrostatic precipitators or filtration devices such as bag houses. A typical "wet" SOx removal system may typically be used in plants where high-sulfur coal is burned. Here, water sprayers may be used to saturate the flue gas, while calcium carbonate (CaCO3) is injected into the flue gas stream. Sulfur dioxide in flue gas may react with the CaCO3 and calcium sulfite (CaSO3.½H2O) may be formed. CaSO3.½H2O may be oxidized in a subsequent reaction forming calcium sulfate (CaSO4.2H2O), also known as gypsum, perhaps through the following reactions:

$$CaCO3+SO2+\tfrac{1}{2}H2O \rightarrow CaSO3.\tfrac{1}{2}H2O+CO2$$

$$CaSO3\tfrac{1}{2}H2O+\tfrac{1}{2}O2+\tfrac{3}{2}H2O \rightarrow CaSO4.2H2O$$

Typical "wet" SOx removal systems however can be limited as they generally employ forced oxidation methods to push desulfurization type reactions to maximize gypsum formation. Both dry and wet SOx removal systems have high capital costs due to the need for expensive non-corrosive materials in the systems. The present invention may assist utilities in complying with new SOx regulations without the high capital equipment costs associated with current SOx remediation technologies.

The present invention may assist utilities or other users in reducing the amount of $CO_2$ that is produced in a combustion furnace or gasification processes due to the catalytic process which improves carbon conversion efficiency. For example, particulate matter (PM) emissions consist primarily of fly ash and unburned carbon produced from burning of coal in a coal fired furnace or boiler and is generally a powdery particulate matter made of the components of coal that do not volatize upon combustion. The content and amount of ash are a function of coal properties, furnace-firing configuration and boiler operation. Depending on the boiler type, approximately 50% to 80% of the total ash exits the boiler as fly ash. PM emissions can also be formed from the reactions of $SO_2$, $NO_x$ compounds and unburned carbon particles. PM emissions in coal-fired power plants is normally carried off in the flue gas and is usually collected from the flue gas using conventional apparatus such as electrostatic precipitators, filtration devices such as bag houses, and/or mechanical devices such as cyclones. This production of large amounts of fly ash may be used for secondary products or uses or disposed of. Various attempts to create secondary product streams from this fly ash waste, such as cement production have been met with some limited success, however, often the vast bulk of fly ash is simply land filled.

As shown above, the generally known systems and techniques for coal combustion generated NOx, SOx, Hg as well as particulate removal are limited in several significant ways. First, such systems are generally expensive requiring significant capital cost and require not only expensive but sometime dangerous chemicals. As noted above, such systems also generally produce hazardous byproducts that must be disposed of increasing such systems incremental costs. Furthermore, such systems typically require additional compliance with government regulations further driving up the cost.

Second, such systems are post-combustion processes requiring additional expensive application and removal capabilities. In addition, the effectiveness of such systems is variable and inconsistent based on the type of coal utilized at a particular plant limiting the range of coal inputs available for use at a specific plant without significant retrofitting. Third, as noted, while some synergies do exist, no single comprehensive system exists to effectively deal with the various combustion byproducts sought to be removed.

In addition, as noted above other processes, such as gasification may also consume carbonaceous and/or other feedstocks. Such exemplary processes can occur in the presence of air, which contains nitrogen. As such, gasification reactors can create by-products that need to be treated or disposed of due to environmental concerns. For example, during the combustion process, carbon dioxide and nitrogen- and/or sulfur-containing compounds, such as oxides of nitrogen and amines, can be formed. Environmental regulations more frequently require the collection and sequestration of carbon dioxide. Amine separator units which are necessary to remove acidic compounds, such as, for example, $H_2S$ and $CO_2$, are very energy intensive, are large and thus have a massive footprint, and can be very costly to operate and maintain. As noted above, the following invention may not only, in some embodiments reduce harmful emissions resulting from the process, but may also improve CO formation, perhaps through a catalytic and/or sorbing process or other process as will be explored below.

Additional embodiments of the inventive technology may include the treatment of carbonaceous and/or other feedstocks for use in gasification, pyrolysis and/or reformation processes. For example, "gasification" herein generally relates to a variety of gasifier systems such as GE gasifier and/or Texaco gasifier referenced generally in the attached IDS and herein incorporated in their entirety by reference. Such systems may generally utilize carbonaceous materials such as for example coal or coke to form select product gas components such as carbon monoxide, hydrogen gas or synthesis gas (syngas), which can be used to produce electricity in an integrated gasification combined cycle (IGCC) process or as a starting point in many chemical processes.

Gasification emphasis again came to the forefront due to the energy crisis of the 1970's. Gasifier technology was perceived as a relatively cheap alternative for small-scale industrial and utility power generation, especially when sufficient sustainable biomass resources were available. By the beginning of the 1980's nearly a dozen (mainly European) manufacturers were offering small-scale wood and charcoal fired "steam generation" power plants. In Western countries, coal gasification systems began to experience expanded interest during the 1980's as an alternative for the utilization of natural gas and oil as the base energy resource. Technology development perhaps mainly evolved as fluidized bed gasification systems for coal, but also for the gasification of biomass. Over the last 15 years, there has been much development of gasification systems directed toward the production of electricity and generation of heat in advanced gas turbine based co-generation units.

As shown in FIG. 1, generally the gasification process may involve the controlled heating of carbonaceous fuels and/or feedstock in the absence of oxygen or reduced oxygen, resulting in thermal decomposition of the fuel into volatile gases and solid carbon material by-product. As noted above, a typical gasifier may convert carbonaceous fuels and/or feedstock into gaseous components by applying heat under pressure in the presence of steam.

A traditional gasifier differs from a combustor in that the amount of air or oxygen available inside the gasifier may be controlled so that only a relatively small portion of the fuel burns completely. This "partial oxidation" process provides heat to further the process. Rather than burning, most of the carbon-containing feedstock is chemically broken apart by the gasifier's heat and pressure, setting into motion chemical reactions that produce primarily hydrogen and carbon monoxide, and other gaseous constituents. Such gasifier systems may involve combustion while others do not involve a combustion pathway. Gasification reactors can convert generally solid feedstocks into gaseous products. For example, gasification reactors can gasify carbonaceous feedstocks, such as coal and/or petroleum coke, to produce desirable gaseous products such as hydrogen and carbon monoxide and some amounts of methane. Gasification reactors generally need to be constructed to withstand the significant pressures and temperatures required to gasify solid feedstocks. Generally, carbon in the coal or coke can be converted into gas by partial combustion with oxygen.

In an exemplary gasification process, carbonaceous or other feedstocks undergo a combustion process as the volatile products and some of the char may react with oxygen to form carbon dioxide and perhaps a small amounts of carbon monoxide, which may further provide heat for the subsequent gasification reactions.

$$C+O_2 \rightarrow CO_2 \text{ and}$$

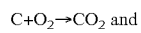

$$C+\tfrac{1}{2}O_2 \rightarrow CO$$

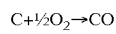

In this process carbon also can react with water in an endothermic water gas reaction to perhaps produce carbon monoxide and hydrogen, via the reaction.

$$C+H_2O \rightarrow H_2+CO$$

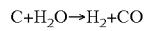

A shift reaction may then convert all or part of the carbon monoxide into hydrogen to reach equilibrium.

$$CO+H_2O \rightarrow CO_2+H_2$$

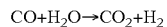

The results of this final mixture may comprise hydrogen and carbon monoxide and may be referred to generally to as synthesis gas or syngas. Additional general reference to various gasification examples may be found in U.S. Pat. No. 7,638,070 and the accompanying provisional IDS incorporated herein in their entireties by reference.

As will be discussed in more detail below, the present invention overcomes the limitations of the prior art and provides a novel and previously unrecognized improved treatment of carbonaceous fuel and/or feedstock sources that may result in the reduction and/or prevention of NOx, SOx and Hg emissions among other CCB's.

SUMMARY OF INVENTION

In some embodiments, the present invention may provide for the processing of carbonaceous and/or feedstock fuel sources with catalytic additives of segregated particulate matter source compounds such as segregated fly ash combined with calcium source compound, such as segregated limestone such that they are distributed across the surface area of said processed carbonaceous fuel particulate forming a catalytically enhanced low emission carbonaceous fuel. Such treatment may occur perhaps pre-consumption—which may include both combustion and non-combustion gasifier processes—and may chemically modify the consumption event resulting in catalytically or otherwise enhancing reactions that lead to the reduction in the formation of NOx, SOx and Hg emissions compared to combustion of a non-treated carbonaceous fuel.

In other embodiments, such treatment may provide improved catalytic activity energetically favoring reactions resulting in the reduction of, for example NOx and/or mercury emission formation and the like. Such improved catalytic or other chemical reactivity properties may be the result of increased surface area contact of the segregated constituent chemicals during combustion of pre-treated coal. Improved catalytic or other chemical reactivity properties may also be a result of the chemical composition of, as well as self- and cross reactivity of said segregated constituent and carbonaceous fuel during processing and/or during combustion and/or gasifying. Such catalytic enhancements may also result in the reduction of various sulfur compounds such as sulfur oxides (SOx) (including, but not limited to SO, $SO_2$, $SO_3$, $SO_2$, $S_6O_2$, $S_2O_2$, and the like). In additional embodiments, such carbonaceous fuel treatment may result in the enhanced removal of Hg species, perhaps across a baghouse. The incorporated fly ash may or may not be indigenous to a specific coal-fired production facility creating value-added use of normal coal combustion waste streams as well as providing significant cost savings in raw materials. Moreover, as discussed below, such treatment steps may be performed in situ at a point of production location, such as a mine. Finally, still further embodiments may facilitate the formation of syngas and improved production of select product gas components, which may also contain reduced amounts of, for example NOx, SOx, and mercury containing emissions.

Some embodiments may further be coupled with other known or traditional remediation processes, techniques and/or compounds to synergistically reduce, for example NOx, SOx, and/or Hg production and/or CCB's from typical carbonaceous and/or feedstock fuel sources consumption processes and especially those of pulverized coal furnaces. All of the forgoing embodiments may be automated as well as configured to be adaptable to pre-existing pulverized or other coal-fired production facilities, gasifier, PDX reactors and the like as well as different species of carbonaceous and/or feedstock species as well as non-combustion processes such as gasification. Additional areas of applicability will become apparent as discussed below.

BRIEF DESCRIPTION OF THE DRAWINGS

FIG. 5: is a list of an exemplary pre-combustion carbonaceous fuel treatment chemical profiles in one embodiment thereof;

FIG. 6: is a list of exemplary carbonaceous fuel treatment mix profiles; and FIG. 7: is a list of exemplary fly ash composition ranges.

DETAILED DESCRIPTION OF THE INVENTION

Figure 1:
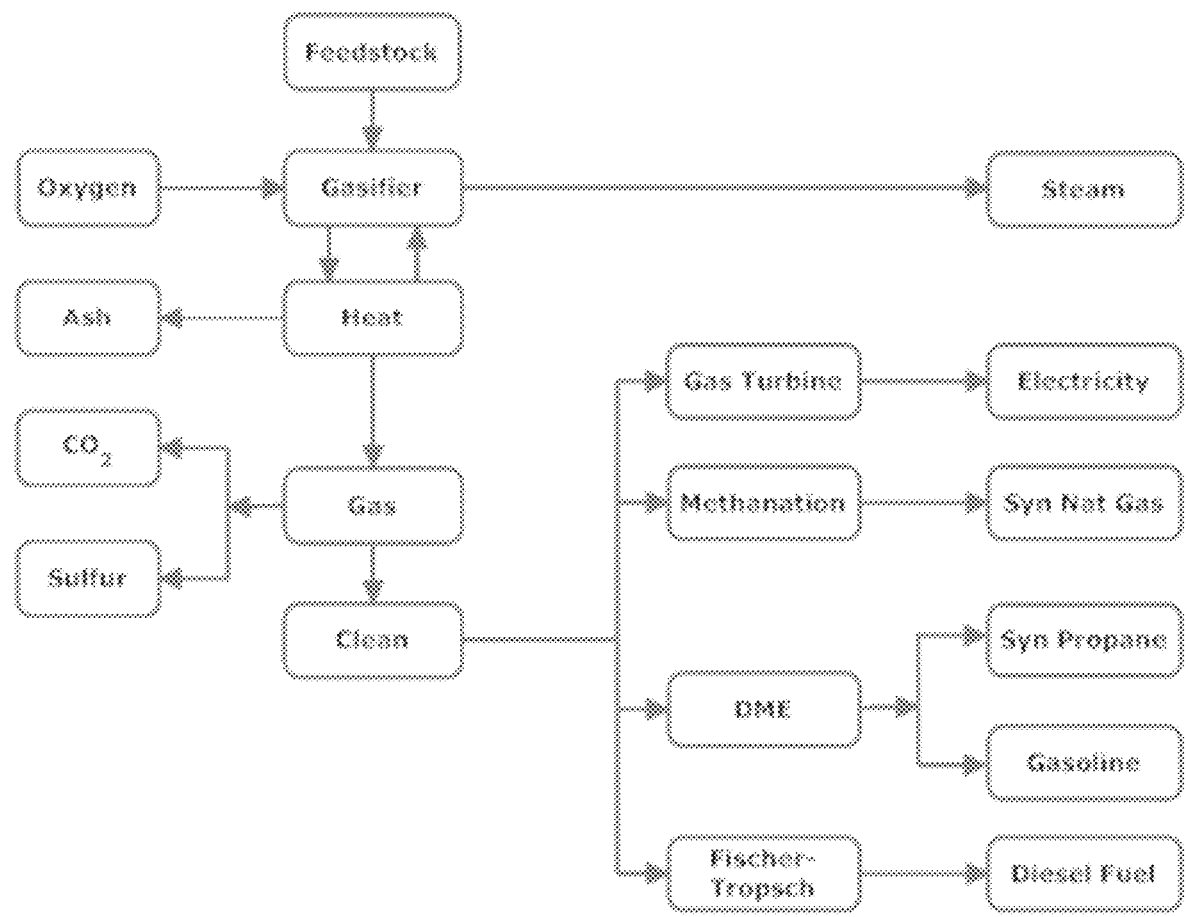
FIG. 1: is a diagram of a generic gasification process in one embodiment thereof.
Figure 2:
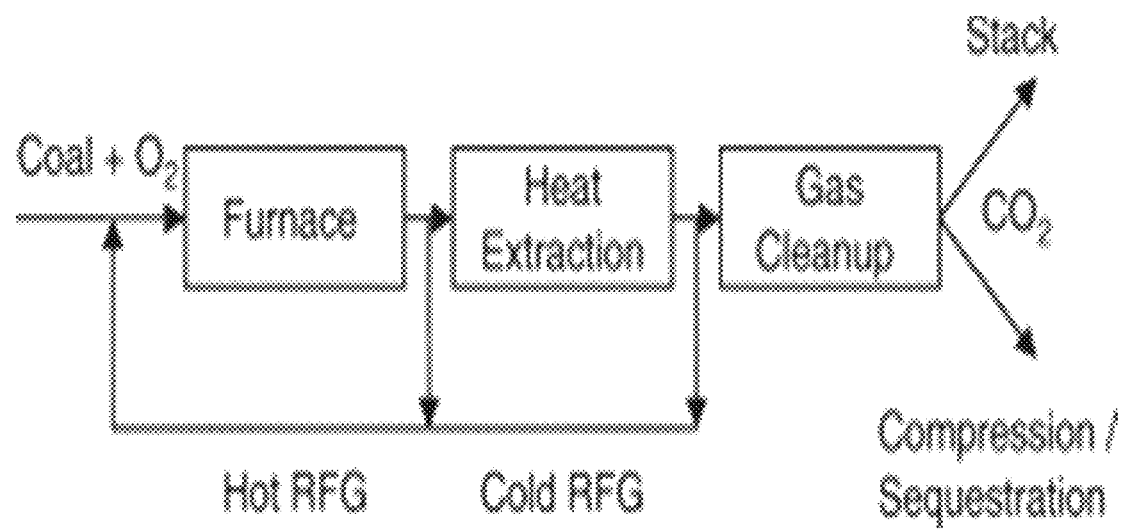
FIG. 2: is a simplified oxygen-fired combustion system in one embodiment thereof.
Figure 3:
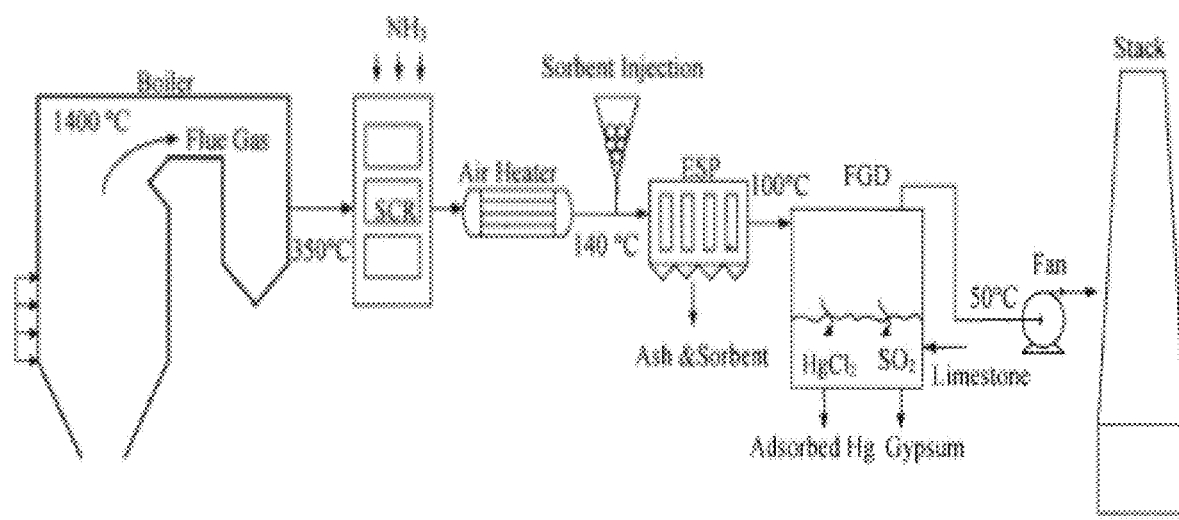
FIG. 3: is a diagram of traditional post-combustion flue gas treatments in one embodiment thereof.

The present invention includes a variety of aspects, which may be combined in different ways. The following descriptions are provided to list elements and describe some of the embodiments of the present invention. These elements are listed with initial embodiments, however it should be understood that they may be combined in any manner and in any number to create additional embodiments. The variously described examples and preferred embodiments should not be construed to limit the present invention to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

One embodiment of the invention may include a method of generating a catalytically enhanced low emission carbonaceous fuel. In one embodiment thereof, this may be accomplished by processing a carbonaceous fuel in the presence of a segregated particulate matter source compound and a segregated calcium source compound, which may be any calcium containing compound or calcium impregnated particles or product, such that they are distributed across the surface area of said processed carbonaceous fuel particulate forming a catalytically enhanced low emission carbonaceous fuel. Combusting said catalytically enhanced low emission carbonaceous fuel wherein said step of combustion results in the reduction of NOx emissions compared to combustion of a non-treated carbonaceous fuel as well as the reduction mercury emissions compared to combustion of a non-treated carbonaceous fuel among others. In some embodiments, the reduction of NOx and/or mercury emissions may be accomplished, for example through catalytic action, perhaps resulting in: catalytically reducing nitrogen oxidation compared to consumption (combustion, partial combustion and/or non-combustion gasification and/or partial combustion gasification) of a non-treated carbonaceous fuel; catalytically reducing NOx formation; catalytically increasing nitrogen reduction; catalytically increasing the decomposition rate of NOx; catalytically increasing the decomposition efficiency of NOx; catalytically reducing mercury species formation; catalytically reducing mercury oxidation reactions; catalytically reducing mercury reduction reactions; catalytically reducing mercury volatilization; increasing the efficiency of traditional remediation and/or capture processes and systems for NOx, SOx, mercury and other CCB's outline above.

By way of example, majority of NOx emissions from coal-fired power plants may be derived from the nitrogen present in the coal (known as Fuel and Prompt NOx), not from the nitrogen introduced with the air (Thermal NOx), which is opposite the case for internal combustion engines, where essentially all of the NOx is thermally formed from nitrogen in the combustion air. Both Fuel NOx and Prompt NOx may form from nitrogen derived from the coal and are released during the devolatilization step of coal combustion. The nitrogen is released from the coal in many different volatile forms, including light gases ($NH_3$, $N_2O$, NO, etc.), light aromatics such as pyrolle and pyrazene, and imbedded in tars as pyrrolic and pyridinic bound nitrogen. These tars may be quickly consumed by the oxygen in the flame, which yields high temperatures at the base of the flame and attaches the flame securely to the burner. Fuel NOx may be formed when oxygen reacts with the nitrogen in the volatiles to convert it to forms that lead along a pathway that, for example may create NO. Prompt NOx may be formed when nitrogen in volatiles on the edge of the flame front encounter a high oxygen concentration and are oxidized at that location to form NO or other products that may rapidly transform to NO.

The stop of, in this example coal devolatilization may generally take place in the first 25 ms of combustion, as the pulverized coal particles are entering the burner. The rapid heating rate may be important for significant volatile yield, which is often much greater than that obtained from a proximate analysis. As the devolatilization event ends, the remaining material from each coal particle may solidify and crosslink to form a solid porous char particle that may take approximately 2 seconds to burn out, and the NO formed from oxidation of the char may be difficult to control.

As noted previously, a common approach to reducing NOx emissions is to create a reducing zone in the base of the flame where the volatiles are released, which may drive the nitrogen in the volatiles along a pathway that leads to the formation of $N_2$ rather than NO. This approach may most effective when combined with conditions that lead to a high volatiles release from the coal, such as higher temperatures at the base of the flame. One way to enhance this approach is to add volatiles to the fuel in the form of fuels that are primarily volatiles, such as oils or biomass solids. The additional volatiles may tend to make the base of the flame more reducing, yet create an even hotter base flame and increase the volatile yield of the coal, releasing more of the coal nitrogen in that section of the furnace and more efficiently converting it to $N_2$.

Another way to enhance the staging approach to reduce NOx, as described generally herein is to add a catalyst to the coal that will enhance coal devolatilization, by breaking the carbon bonds forming the coal, which will cause the coal to breakdown into metaplast (volatile and tar precursor) quicker and to a greater extent than it would without the catalyst. As noted elsewhere, iron oxide may an effective catalyst for this purpose. Moreover, calcium oxide may also be effective as a combustion or devolatilization catalyst and further calcium and iron may effectively catalyze the transformation of the organically bound nitrogen in coal into diatomic nitrogen gas.

In certain embodiments these catalysts are able to directly catalyze the conversion of char-bound nitrogen to nitrogen gas, while in other embodiments the catalytic reduction may be accomplished through increasing the volatile yield significantly reducing the NOx formation if the burner or furnace was, for example staged for low-NOx emissions. The catalytic enhancement of devolatilization increases the percentage of nitrogen released with the volatiles and makes the base of the flame more reducing by increasing the volatiles, both of which tend to drive NOx lower in a staged flame or furnace.

As noted, in some embodiments fly ash contains iron oxide, calcium oxide, and titanium oxide, all of which are combustion, gasification, and pyrolysis enhancing catalysts. In certain embodiments, their catalytic effect is achieved through alteration of their physical properties, specifically, one embodiment (1) the fineness of the segregated material added and its dispersion and/or adhesion to the surface of the pulverized coal particles, (2) the availability of catalyst material on the surface of the additive, for example flyash may be included inside a silica and alumina shell, (3) the activity of the catalytic material, and (4) the active catalytic surface area.

In some embodiment, if an inert powder or segregated particulate matter and/or calcium source compound may be applied to the coal. Such constituents may take physical residence of locations on coal particles and occupy a significant fraction of the external coal-particle surface, thus preventing the active catalyst from locating at those active sites and reducing its effectiveness as a catalyst additive.

In one embodiment, the inventive technology may affect the devolatilization of a carbonaceous fuel. In one exemplary model, NOx may be generated from the combustion of coal. In general NOx may be generated through three different ways: thermal NOx, prompt NOx and fuel-NOx. Thermal NOx refers to NOx formed with reactions between N2 and O2. Its formation may be dominated by the combustion temperature which is effective above 1400° C. Prompt NOx refers to the reaction between N2 and hydrocarbon radicals such as CHi. Prompt-NOx usually accounts for a very small part of overall NOx emissions from coal combustion under typical operating conditions. Fuel-NOx comes from nitrogen species bound in fuel. In pulverized coal devolatilization, fuel-N may divided into volatile-N and char-N. As generally shown in FIG. 7, during combustion process, the volatile-N transforms into either NO and N2, while char-N goes through the heterogeneous reactions along with the char oxidation. In conventional coal combustion, fuel-N is the dominant source for NO production with the thermal-N as a minor contributor. In oxy-coal combustion, N2 is substitute by the recycled flue gas which the main component is CO2 and H2O. So the NO may be formed by fuel-N in theory. Air entrainment in the burners and milling system may give rise to increased NOx emission due to thermal-N formation.

In one embodiment, the alteration of the devolatilization processes/profile of a carbonaceous fuel may be catalytic in nature, for example by energetically favoring certain reactions that result in the reduction in NOx or other emissions. In other embodiments, alteration of the devolatilization process may include the physical interruption of certain chemical constitutes, perhaps due to the close proximity and association of segregates particulate and calcium source matter associated with the carbonaceous fuel. In another embodiment, the inventive technology may prevent the devolatilization of fuel bound (fuel-N) nitrogen into Char-N and/or Vol-N. In still further embodiment, the inventive technology may prevent the conversion of Char-N and/or Vol-N into NOx compounds.

Another embodiment of the invention may include a method of generating a low emission carbonaceous fuel additive. Generation of such a low emission carbonaceous fuel additive may include the steps of segregating a quantity of particulate matter source compound and a quantity of segregating calcium source compound (or perhaps segregating non-halogen containing calcium source compound) and distributing the segregated particulate matter source compound and the segregated containing calcium source compound across the surface area of a carbonaceous fuel particulate forming a catalytically enhanced low emission carbonaceous fuel. Combusting said catalytically enhanced low emission carbonaceous fuel wherein said step of combustion results in the reduction of NOx emissions compared to combustion of a non-treated carbonaceous fuel as well as the reduction mercury emissions compared to combustion of a non-treated carbonaceous fuel among others.

Another embodiment of the invention may include a method of in situ treatment of carbonaceous fuel at a point of production. This may be accomplished through one or more of the following steps including establishing a quantity of particulate matter source compound from the combustion of a carbonaceous fuel then segregating said quantity of particulate matter source compound as well as establishing and segregating a quantity of calcium source compound. Treatment of a carbonaceous fuel may occur in situ, or at the location of a point of production such as a mine or storage, transport, or processing facility. In some applications. This in situ treatment may include combining segregated particulate matter source compound and/or said segregated calcium source compound with of said carbonaceous fuel as well as perhaps adhering the segregated particulate matter source compound and/or segregated containing calcium source compound to a carbonaceous fuel, perhaps through through application of a binding agent. Though, as discussed below, such adhering step may be mitted in certain embodiments, for example where the transport distance is short so as to mitigate loss of treatment constituents en route, as well as perhaps where a treated carbonaceous fuel has been allowed to dry thereby perhaps adhering onto the surface of the fuel. Again, in certain embodiments the treated carbonaceous fuel may be transported to a combustion facility to be processed. Examples of such processing may include one or more of the following: mixing; crushing; grinding; milling; grinding; and/or compressing. In a preferred embodiment said step of processing may include pulverization which may further include one or more of the following pulverization processes: low speed pulverization; medium speed pulverization; high speed pulverization; ball pulverization; tube pulverization; ring and ball pulverization; vertical spindle roller pulverization; bowl pulverization; attrition pulverization; impact pulverization; and/or hammer pulverization.

Such step of processing a treated carbonaceous fuel may allow the bound segregated particulate matter source compound and/or the segregated containing calcium source compound to be distributed and/or dispersed across the entire surface area of the carbonaceous fuel particulate forming a catalytically enhanced low emission carbonaceous fuel. As noted above, combusting said catalytically enhanced low emission carbonaceous fuel wherein said step of combustion results in the reduction of NOx emissions compared to combustion of a non-treated carbonaceous fuel as well as the reduction mercury emissions compared to combustion of a non-treated carbonaceous fuel among others.

In various embodiments, the invention provides systems, compositions, and methods for reducing emissions of NOx, SOx and Hg and perhaps other CCB's that arise from the combustion of coal or through gasification. In particular—as noted above—coal burning facilities such as those used by electrical utilities may be used as exemplary model of the current invention. Further, embodiments adapted to pulverized coal furnaces may be particularly significant. In addition, it should be noted that such examples are not limiting, as the current invention may be applied to a variety of commercial and industrial processes that may utilize combustion of coal, or other carbonaceous compounds resulting in production or NOx, SOx or Hg emissions individually or collectively. Another example would be the Texaco/General Electric pulverized coal slurry partial oxidation gasification reactor or generally a partial oxidation reactor (PDX). In a preferred embodiment, the current inventive technology may provide for the pre-combustion treatment of coal resulting in greater than, or at least a 40% reduction in Hg, and greater than, or at least 20% reduction in NOx, as well as a measurable reduction in SOx emissions that result from the modified combustion of coal as compared to untreated coal. It should be noted that the following percent reductions in the above mentioned chemical constituents is merely exemplary and are in no way limiting.

As noted above, in a typical coal-fired facility, and especially a pulverized coal furnace facility, coal combustion results in the production of particulate matter such as fly ash which typically is considered a secondary waste stream and must be re-purposed or disposed of through land filling or other appropriate methods. It should be noted that the terms particulate matter may encompass numerous combustion and/or gasification by-products as well as other particles than NOx and/or mercury and/or SOx and/or other CCB emissions.) In one embodiment of the current invention, fly ash from coal combustion may be collected and re-purposed for the pre-combustion treatment of coal. As referenced generally in FIG. 6, the exact compounds present in any given fly ash sample may vary across various facilities and may further be influenced by variables such as temperature, coal used, combustion temperature, collection techniques employed and the like, a fly ash sample resulting from typical coal combustion may contain the following general chemical profile: Silicon Dioxide (SiO2); Aluminum Oxide (Al2O3); Iron Oxide (Fe2O3); Calcium Oxide (CaO); Magnesium Oxide(MgO); Potassium Oxide (K2O); Sodium Oxide (Na2O); Titanium Dioxide (TiO2); Sulfur Trioxide (SO3); Phosphorus Pentoxide (P2O5); Strontium Oxide (SrO); Barium Oxide (BaO); Manganese Oxide (MnO); and/or Other Trace Chemicals.

It should be noted that many different types of fly ash may be contemplated such as fly ash from other carbonaceous combustion as well as non-combustion process as well as perhaps fly ash from biomass, wood and/or other feed stocks. In one preferred embodiment, the collected fly ash may be introduced to pre-combustion coal and further act as a catalytic agent reducing the formation of NOx species during combustion among others. For example, the iron and calcium oxides may be present and act as a catalyst to reduce NOx formation and/or emissions. Principally, presence of Iron compounds in various forms may control NOx emissions through decreasing the conversion rates of char-N, tar-N, HCN, and NH3 to NOx. In addition, calcium oxide (CaO) and/or (Fe2O3) may act to reduce NOx formation perhaps through the catalytic decomposition of perhaps nitrous oxide ($N_2O$). It should be noted that each of the individual chemical constituents may act independently and/or synergistically in combination to produce the above referenced emission/formation reductions. For example, in one embodiment may include the step of processing segregated particulate matter source compound and a segregated calcium source compound such that they are distributed across the surface area of a processed carbonaceous fuel particulate forming a synergistic interaction between a quantity of segregated fly ash and a quantity of segregated limestone and a carbonaceous fuel resulting in the reduction of NOx, and/or mercury emissions compared to consumption of a non-treated carbonaceous material.

In another embodiment, such fly-ash may combine with a carbonaceous fuel source, such as coal—perhaps having been previously pulverized and/or milled together—such that the association of said segregated fly ash with such coal particles may act as a catalyst or initiate other processes to energetically favor formation of elemental nitrogen as $N_2$ as opposed to NO or another NOx compound. In additional embodiments such reaction may be accomplished through the synergistic action and/or interaction of any of the fly ash constitutes and, for example, carbonaceous particles or fuel source.

In additional embodiments, a segregated particulate matter source compound and a segregated calcium source compound treatment may act to form a catalytic film and/or a synergistic catalytic film and/or a catalytically active adsorbate film across the surface area of said processed carbonaceous fuel particulate. Certain embodiments this carbonaceous fuel particulate may include carbonaceous gas particulate, carbonaceous liquid particulate, and/or carbonaceous solid particulate. In a preferred embodiment, a carbonaceous fuel particulate may include one or more of the following: coal particulate, pulverized coal particulate, milled coal particulate, crushed coal particulate, ground coal particulate, and/or compressed coal particulate. In some embodiments, such catalytic films may alter, such as increasing and or decreasing the chemical and/or even atomic interactions of combustion contaminants and/or other consumption produced compounds compared to consumption of a non-treated carbonaceous materials.

In one embodiment, segregated particulate matter source compound such as fly ash may adsorb various atoms, ions, or molecules from a gas, liquid, or dissolved solid such as to its surface. The resultant adsorbate on the surface of the adsorbent fly ash may act to sequester, for example NOx, SOx or Hg species, or perhaps position such species in an adsorbate film in such a manner as to allow energetically favorable reactions with other chemical constituents resulting perhaps in the reduction in the aforementioned compounds. Additional chemical, adsorption and/or other catalytic reactions resulting in the reduction of NOx, SOx, Hg and other CCB's, while not explicitly stated are contemplated within the scope of this disclosure.

In one embodiment of the current invention it may be advantageous to increase the available surface area of the selected fly ash prior to pre-combustion treatment of the coal. Such surface area increase may be accomplished through the pre-combustion treatment of coal with finely pulverized, and/or milled segregated particulate matter. Such segregated particulate matter source compound generally being referred to as segregated particulate matter source compound. In one example, collected fly ash may be segregated by separating the fly ash into variously sized particles. Such particle size may be accomplished through mesh segregation, grinding, blasting, gradient or centrifugal separation, cyclone separation, and other known pulverization, milling and/or segregation techniques. As noted, in one preferred embodiment, this segregation may be accomplished through passing the raw fly ash through a mesh system. For example, in a mesh system, the mesh number represents the number of openings or the like of a mesh across a linear inch of screen. For example, a typical mesh to micron conversion may have a value of "100 mesh" which may exhibit approximately 100 openings in a linear inch of mesh screen. Taking into account for varying wire thickness, an approximate size of particle can be isolated using said screen mesh. Returning to the following example, particles passing through a 100 mesh may isolate a group of particles of approximately ~149 microns and smaller. While a variety of mesh and size ranges are contemplated within the invention, however, in a preferred embodiment an approximate maximum and/or minimum segregated particulate matter source compound size range of 100 µM to 0.5 uM as generated by their corresponding mesh value is contemplated within this disclosure. Ranges for such sizing also exist with the disclosure and as part of the invention are explained below.

Increasing the available surface area may enhance the catalytic properties of the segregated particulate matter source compound during subsequent coal combustion. Such enhanced catalytic and/or sorption properties may be a result of the enhanced distribution of the aforementioned segregated particulate matter source compound treatment on said carbonaceous fuel and/or feedstock such as coal, while in additional embodiments, such segregated particulate matter source compound may be milled and/or pulverized with said carbonaceous fuel prior to combustion resulting in perhaps, in the enhanced distribution of the segregate particles across the surface of the pulverized coal particles, or even more uniform distribution within the combustion furnace and/or resulting convection pathway. In addition, treatment of such carbonaceous fuel and/or feedstock may promote combustion, gasification, or pyrolysis or other high efficiency contact and/or chemical positioning with combustion by products. This enhanced surface area and distribution may result in the overall reduction of NOx, SOx and Hg species and other CCB's constituents of the flue gases as discussed previously.

Another embodiment of the inventive technology may include the pre-combustion treatment of carbonaceous fuel and/or feedstock with segregated calcium source compound, such as limestone to facilitate the non-formation/removal of NOx, SOx, Hg species and the like. In a preferred embodiment such segregated calcium source compound may act as a source of non-halogenated calcium (Ca) as well as other source materials that may generally interact with, inhibit the formation of, and/or facilitate the removal of NOx, SOx, and Hg species among others CCB's. While various types of limestone may be contemplated, any such appropriate source of the general segregated calcium source compound constituents, such as those found in limestone may be used individually or collectively. For example, in a preferred embodiment segregated limestone may act as a source of: Calcium Carbonate (CaCO3); Magnesium carbonate (MgCO3); Crystalline Silica (Si); other trace compounds.

In certain embodiments the segregated calcium source compound may be pulverized, milled or otherwise segregated, perhaps utilizing the same or similar mesh or cyclone system described above. In this embodiment, the aforementioned segregated calcium source compound particles may be variable in size, perhaps ranging from 100 µM to 0.5 uM or any desired mesh value. Such particle size may be accomplished through mesh segregation, grinding, blasting, gradient or centrifugal separation, cyclone separation, and other known pulverization, milling and/or segregation techniques. It should, however, be noted that based on the characteristics of mesh segregation pulverization, and/or milling, any resultant segregated material, whether it be, for example fly ash or limestone may represent a range of particle sizes with the mesh generally only providing an upper size limit. In some instances the lower limit of the particle size may include perhaps even individual atomic units.

Similar to the discussion of segregated particulate matter particles above, such discussion is merely exemplary and not in any way limiting on the wide scope of contemplated type, sizes or combinations of particle sizes encompassed in this disclosure. In this regard, such finely segregated calcium source compound particles may enhance the removal of Hg perhaps by helping to retain mercury in the carbon collected as the flue gas passes through a bag-house. In additional embodiments, calcium source compound source provided in the limestone may provide for a catalytic or other pathway to prevent the formation of mercury species in the first place. In still further embodiments, such mercury species may be captured by a calcium source, sorbed on the calcium, and/or perhaps processed in the absence of a halogen such as bromine. In still further embodiments, the segregated calcium source compound treatment of the coal pre-combustion may act as an catalytically active adsorbate film, perhaps in conjunction with said segregated particulate matter providing catalytic sites to facilitating binding and remediation reactions of certain mercury species, as well as capture, for example through a baghouse system. In one embodiment, adding limestone to a carbonaceous fuel, such as pulverized coal, may during combustion convert to calcium oxide in the furnace and subsequently may increase the calcium oxide concentration in the baghouse filter cake. In certain embodiments, this calcium may enhance the ability of the unburned carbon (UBC) in the fly ash to retain mercury adsorbed on its surface. Such increased reduction of mercury emissions may be at least ore greater than 40% in some embodiments, though a variety of ranges may be achieved.

Figure 4:
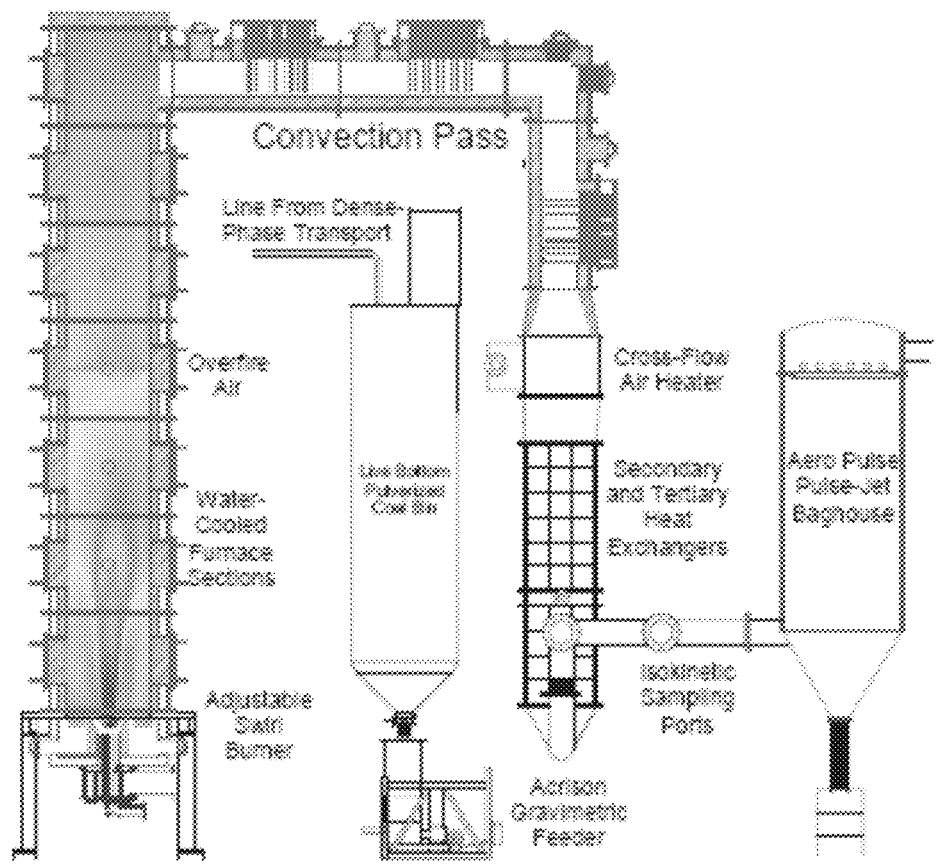
FIG. 4: is a diagram of an exemplary pulverized coal-fired system including particulate matter removal systems in one embodiment thereof.
Figure 8:
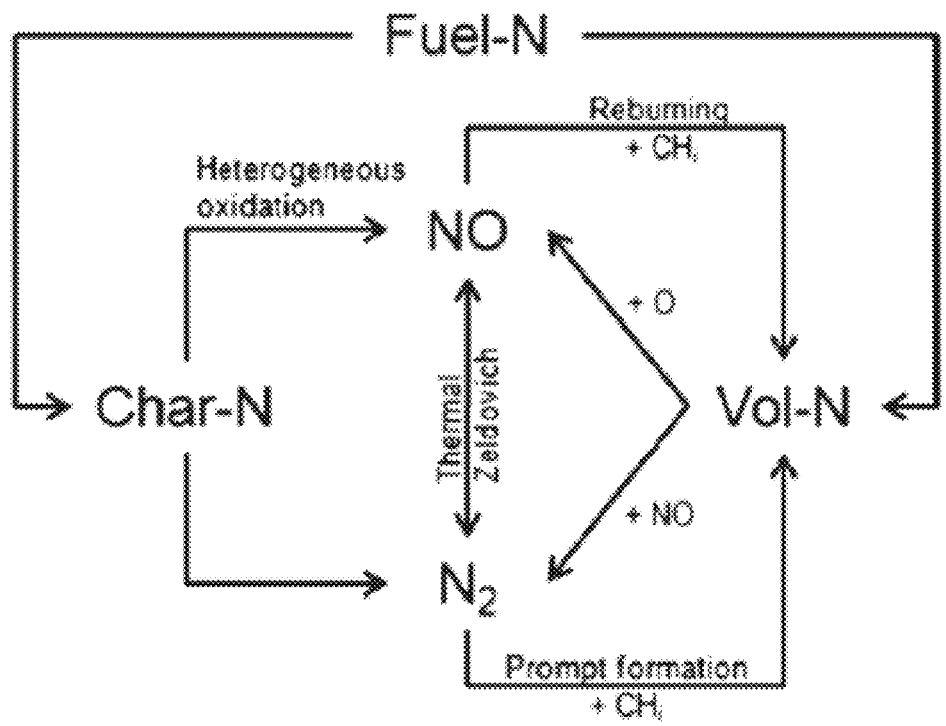
FIG. 8: is an exemplary model of devolatilization.

In another preferred embodiment, the segregated calcium source compound, such as segregated limestone may work synergistically with the segregated particulate matter source, compound such as fly ash to prevent the formation of, or enhance the removal of NOx, SOx, Hg and CCB's formed during carbonaceous fuel combustion and/or gasification. For example, while a variety of amounts and ratios may be contemplated, in an exemplary embodiment approximately 10 lbs of segregated particulate matter source compound and said segregated calcium source compound (collectively additive) may be added per ton of carbonaceous material. In addition, as one example, for example 7.5 lbs. or 75% of such pre-combustion coal treatment substance may be comprised of segregated and perhaps indigenous fly ash, while the remaining approximately 2.5 lbs or 25% may be comprised of segregated limestone. Further, by way of non-limiting example, as shown in FIG. 4, varying percent ratios of individual fly ash and limestone may be contemplated, for example, in a preferred embodiment the individual constituents' reference in FIG. 4 may form the aforementioned treatment. Ranges for such compositions also exist within this disclosure and as part of this invention again as demonstrated generally in FIG. 4. Such examples are merely exemplary in nature and are in no way limiting on the variety of combinations contemplated within this application.

In certain embodiments the pre-combustion catalytic treatment of coal may even result in a reduction of furnace temperatures, for example in a coal boiler. In some embodiments, furnace temperature may remain largely consistent with untreated coal at positions close to the base of the flame and at the furnace exit. Such selective temperature alterations may also serve to prevent the formation of, and/or facilitate removal of various undesired NOx, SOx, and Hg species among other CCB's. In other embodiments, increases in carbon-monoxide (CO) formation may occur after pre-combustion treatment within the flue gas. In some instances, such additional formation of CO may prevent the formation of, and/or facilitate removal various undesired NOx, SOx, and Hg species among other CCB's. In additional gasification applications, such pre-consumption treatment may allow the gasification process to proceed under lower temperatures reducing, perhaps undesired byproducts as well as conserving energy and capital expenditures.

As noted above, in a preferred embodiment, treatment of the carbonaceous fuel and/or feedstock with segregated particulate matter source compound, segregated calcium source compound or a combination of the two may occur pre-combustion. However, such embodiment is merely exemplary as such treatment may also occur concurrently with the carbonaceous fuel or feedstock combustion, post combustion, or at any point along a subsequent convection pathway or even after the bag house and/or electrostatic precipitators which may be typical of coal combustion. It should further be noted that the pre-combustion treatment of coal may occur through a variety of combinations, mixtures, methods and techniques. For example, in one preferred embodiment, a mixture of segregated fly ash and segregated limestone may be introduced to coal as it is being fed into, for example a power plant. In some instances, such treatment may occur prior to, or simultaneously with the carbonaceous material, such as coal entering a pulverizer before to being directed to a furnace. In some embodiments, treatment may include both dry and wet applications. For example, in one embodiment, segregated fly ash may be combining with coal in a dry "powered" form, followed by the combining of segregated limestone through, perhaps a slurry of water or other material. In this preferred embodiment such limestone impregnated slurry may also act as a dust suppressor for the ultra-fine segregated fly ash. In a preferred embodiment a segregated fly ash, and/or segregated limestone may be solubilized. Moreover, such uses of, for example segregated fly ash may prevent costly landfilling and/or pond storage. Other embodiments may include wetting a quantity of segregated particulate matter source compound and a segregated calcium source compound. Additional embodiments may include the step of adhering a segregated particulate matter source compound and/or segregated containing calcium source compound to a carbonaceous fuel, for example prior to combustion and/or even processing through application of a binding agent. Such step may be accomplish in situ at a point of production, such as a mine or prior to transport to a consumption facility. Examples of such binding agents may include or more of the following: glue; adhesive; asphalt, coal tar; coal pitch, pitch, starch, magnesia, lignin, montmorillonite, attapulgite, bitumen, and/or wax.

As noted above, in a preferred embodiment indigenous fly ash from a coal-fired facility may be harvested and segregated on-site prior to treatment. Limestone may be established for example through a supplier, for example in a powdered form at a desired particles size and/or may be segregated on-site prior to treatment. Naturally, as can be appreciated, all segregated particles sizes may be altered in various ratios to provide an optimized result based on the NOx, SOx, Hg or other harmful emission profile of a particular facility. Such alterations may be automated as well. In addition, the length, amount, and duration of pre-combustion treatment may be altered so as to optimize removal of NOx, SOx, Hg and the like. Additional considerations, such a furnace and coal type as well as coal content may be used to alter the varying treatment parameters. In certain embodiments, real- and/or approximately real-time monitoring of a coal-fired facility may be employed to automatically alter any treatment parameter. Additional embodiments may include the further impregnation of the fly ash and or limestone additives with additional additives to reduce the formation and or increase removal or perhaps prevention of compounds such a NOx, SOx, Hg species and the like. Such impregnated segregated particulate matter source compound may include known chemical catalytic compounds and/or sorbant/sorbent materials or any compound that may result in a desired combustion modification. In another certain embodiments the pre-combustion treatment materials may be captured and re-used, for example, for additional pre-combustion treatment of carbonaceous fuel and/or feedstocks, and or disposed of through traditional processes known within the industry.

Additional embodiments may include not only indigenous sources of segregated particulate matter source compound, but various types and kinds of segregated particulate matter source compound perhaps derived even various blends of disparate classes of segregated particulate matter source compound. In one preferred embodiment, fly ash derived from the combustion of bitumous, subbituminous and/or lignite coal may be blended with fly ash from disparate sources. Such fly ash hybrid blends may be monitored and adjusted to achieve a desire level of effect, such as the non-formation and or reduction of of NOx, SOx and or mercury emissions.

In one preferred embodiment, treatment constituents, such as segregated particulate matter source compound and said segregated calcium source compound may be milled with, for example a carbonaceous fuel and/or feedstock prior to combustion so as to distribute the constituents across the surface area of processed carbonaceous fuel particulates. In one such preferred embodiment, segregated fly ash and segregated limestone may be pulverized, and/or milled in conjunction with coal prior to injection into a furnace for example. In other embodiments, such fly ash and limestone may be segregated then applied to a carbonaceous and/or feedstock fuel source—in this embodiment coal—prior to milling and/or pulverization. In this embodiment, such forced interaction may form enhanced interface and/or bonding with the pulverized coal particles such that they are in close proximity perhaps physically touching one another. In some embodiments, such close proximity contact may be the result of electro- and/or magnetic- and or chemical attractions. In addition, in some preferred embodiments the fly ash may be wetted to facilitate such binding characteristics. In this manner, in a preferred embodiment segregated fly ash and/or segregated limestone and/or a combination of both may form a hybrid formation facilitating the catalytic and/or adsorption or other chemical attributes described herein. In a preferred embodiment, sufficient pre-consumption treatment constituents may be added and milled, with perhaps coal, to maximally cover the coal particles surface. A specific range of segregated fly ash and limestone particle size may be achieved to optimize the desired catalytic and/or adsorption or other properties of the treatment. In certain embodiments, such a standard size for the treatment additives and/or coal particle may be 70% passing through a 200 mesh screen. It should of course be noted that such optimization may vary from combustion, to non-combustion processes, as well as systems that employ, for example, liquid fuels such as natural gas and the like.

In additional embodiments, for example, additional additives and/or segregated additives may be considered such as alumina, as well as lime, lime kiln dust, cement, pumice, and a combination of cement and pumice or other rare earth metals. For example, iron as well as, perhaps other rare earth elements/metals such as platinum, silver may act as a catalyst to convert NOx to N2+O2. In some embodiments such catalysts may utilize compounds such as alumina which may have high oxygen storage to promote the reaction. For example, iron oxide may be present in certain kiln dusts as well as pumice that may also be acting as a promoter. (For example, alumina may be approximately 4% of kiln dust. In turn, kiln dust may also have approximately 2% iron oxide and perhaps 40% to 50% lime. Pumice may have approximately 12% alumina, 2% iron oxide, and virtually no lime). In other embodiment, such rare earth metals may be present in the coal fly ash. For example, conversion of NO to $N_2$ may occur after combustion such that any alumina and/or iron oxide present may coat the boiler and flue along with perhaps rare earth elements.

In one preferred embodiment, the pre-combustion addition of segregated fly ash from a San Juan Power Plant and a certain amount of segregated limestone distributed across the surface area of processed coal may achieve at least a 20% reduction in $NO_x$. In addition, the Hg concentration at the baghouse outlet may be measured as below half that in the furnace, indicating at least, if not greater that 40% mercury removal as a result of the pre-combustion additive.

As noted above, while embodiments of the invention have been described in general terms of the combustion of carbonaceous fuel, all such inventive principles are equally applicable to various gasification process. For example, embodiments of the invention may include a method of catalyzing the gasification of carbonaceous feedstock. Such process may include, for example the steps of segregating a quantity of particulate matter source compound and/or calcium source compound. These segregated constituents may be distributed across the surface area of a carbonaceous feedstock particulate forming a catalytically enhanced carbonaceous feedstock. This catalytically enhanced carbonaceous feedstock may be inserted into a gasifier system where its gasification may produce select product gas components having decreased contaminants compared to gasification without said catalytically enhanced carbonaceous feedstock. In other embodiments, gasification of a catalytically enhanced carbonaceous feedstock may result in increased yield of select product gas components compared to gasification without said catalytically enhanced carbonaceous feedstock.

For example in a preferred embodiment, segregated particulate matter, such as segregated fly ash, and a segregated calcium source compound, such as segregated limestone may be distributed across the surface area of a carbonaceous feedstock particulate forming a catalytically enhanced carbonaceous feedstock. Gasification of such catalytically enhanced carbonaceous feedstock may result in the reduction of NOx, SOx, mercury and other gasification emissions compared to gasification of a non-treated carbonaceous feedstock. In a preferred embodiments Gasification of such catalytically enhanced carbonaceous feedstock may result in the reduction of NOx, and mercury emissions by at least or greater than 20%.

Application of the current invention may be applicable to a variety of gasification systems. For example, gasifying a catalytically enhanced carbonaceous feedstock may include the steps of: gasifying said catalytically enhanced carbonaceous feedstock in at least one coal gasifier; gasifying said catalytically enhanced carbonaceous feedstock in at least one fixed bed gasifier; gasifying said catalytically enhanced carbonaceous feedstock in at least one downdraft co-current current fixed bed gasifier; gasifying said catalytically enhanced carbonaceous feedstock in at least one updraft co-current current fixed bed gasifier; gasifying said catalytically enhanced carbonaceous feedstock in at least one updraft counter-current fixed bed gasifier; gasifying said catalytically enhanced carbonaceous feedstock in at least one cross-draft fixed bed gasifier; gasifying said catalytically enhanced carbonaceous feedstock in at least one open core fixed bed gasifier; gasifying said catalytically enhanced carbonaceous feedstock in at least one pressurized circulating gasifier; gasifying said catalytically enhanced carbonaceous feedstock in at least one fluidized bed gasifier; gasifying said catalytically enhanced carbonaceous feedstock in at least one atmospheric circulating gasifier; gasifying said catalytically enhanced carbonaceous feedstock in at least one fluidized bed gasifier; gasifying said catalytically enhanced carbonaceous feedstock in at least one hydrothermal gasifier; gasifying said catalytically enhanced carbonaceous feedstock in at least one supercritical water gasifier; gasifying said catalytically enhanced carbonaceous feedstock in at least one plasma arc gasifier; gasifying said catalytically enhanced carbonaceous feedstock in at least one 2-stage gasifier; gasifying said catalytically enhanced carbonaceous feedstock in at least one open-top gasifier; gasifying said catalytically enhanced carbonaceous feedstock in at least one aqueous phase reforming gasifier; and gasifying said catalytically enhanced carbonaceous feedstock in at least one partial oxidation gasifier.

Application of the current invention may be applicable to a variety of gasification feedstock. Exemplary carbonaceous feedstock may include: coal; bituminous; anthracite; subbituminous; lignite; liquefied coal; petroleum coke; biomass; petroleum; peat; residual oils; natural gas; pulverized coal; waste-derived feedstocks; wood pellets; wood chips; waste wood; plastic; aluminum; municipal solid waste (MSW); refuse-derived fuel (RDF); agricultural and industrial waste; sewage sludge; switch grass; seed corn; corn stover; and crop residues.

Additional embodiments of the inventive technology may include increases in the yield and/or rate of carbonaceous feedstock consumption resulting in perhaps improved yields of select product gas components and/or syngas than gasification without said catalytically enhanced carbonaceous feedstock. Yield increase may select product gas components and/or syngas may include, in some embodiments a yield increase of approximately 0.1-10% percent. Additional embodiments may include even higher select product gas components and/or syngas yield improvements.

Naturally, all embodiments discussed herein are merely illustrative and should not be construed to limit the scope of the inventive technology consistent with the broader inventive principles disclosed. As may be easily understood from the foregoing, the basic concepts of the present inventive technology may be embodied in a variety of ways. It generally involves systems, methods, techniques as well as devices to accomplish providing methods and apparatus for the treatment of carbonaceous fuel and the like. In this application, the improved carbonaceous fuel treatment techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the statements of invention. As can be easily understood from the foregoing, the basic concepts of the present invention may be embodied in a variety of ways. It involves both techniques as well as devices to accomplish the appropriate system for providing for the treatment of carbonaceous fuel the like. In this application, the techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in method-oriented terminology, each element of the claims corresponds to a device. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting any claims. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "pulverizer" should be understood to encompass disclosure of the act of "pulverizing"—whether explicitly discussed or not—and, conversely, were there effectively disclosure of the act of "pulverizing", such a disclosure should be understood to encompass disclosure of a "pulverizing method and/or technique, and or device" and even a "means for pulverizing." Such changes and alternative terms are to be understood to be explicitly included in the description.

Any patents, publications, or other references mentioned in this application for patent, such as in the specification or an IDS are hereby incorporated herein by reference in their entirety. Any priority case(s) claimed by this application is hereby appended and hereby incorporated herein by reference in their entirety. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated herein by reference in their entirety. Finally, all references listed in the list of References To Be Incorporated By Reference In Accordance With The Patent Application or other information disclosure statement and the like filed with the application are hereby appended and hereby incorporated herein by reference in their entirety, however, as to each of the above, to the extent that such information or statements incorporated by reference might be considered inconsistent with the patenting of this/these invention(s) such statements are expressly not to be considered as made by the applicant(s).

Thus, the applicant(s) should be understood to have support to claim and make a statement of invention to at least: i) each of the system (with corresponding methods and apparatus) of providing methods and/or apparatus for the treatment of carbonaceous fuel as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, xii) each potentially dependent claim or concept as a dependency on each and every one of the independent claims or concepts presented, and xiii) all inventions described herein.

In addition and as to automated and/or computer aspects and each aspect amenable to programming or other electronic automation, the applicant(s) should be understood to have support to claim and make a statement of invention to at least: xvi) processes performed with the aid of or on a computer and or controller as described throughout the above discussion, xv) a programmable apparatus as described throughout the above discussion, xvi) a computer readable memory encoded with data to direct a computer comprising means or elements which function as described throughout the above discussion, xvii) a computer configured as herein disclosed and described, xviii) individual or combined subroutines and programs as herein disclosed and described, xix) the related methods disclosed and described, xx) similar, equivalent, and even implicit variations of each of these systems and methods, xxi) those alternative designs which accomplish each of the functions shown as are disclosed and described, xxii) those alternative designs and methods which accomplish each of the functions shown as are implicit to accomplish that which is disclosed and described, xxiii) each feature, component, and step shown as separate and independent inventions, and xxiv) the various combinations and permutations of each of the above.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in *Hakim v. Cannon Avent Group, PLC*, 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. It should be understood that this application also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon. The inventive subject matter is to include, but certainly not be limited as, a system substantially as herein described with reference to any one or more of the Figures and Description (including the following: for example, the process according to any claims and further comprising any of the steps as shown in any Figures, separately, in any combination or permutation).

What is claimed is:

1. A method of utilizing a low emission carbonaceous fuel comprising the steps of:
   receiving said low emission carbonaceous fuel, wherein said low emission carbonaceous fuel was generated by steps comprising:
      capturing a quantity of particulate matter source compound from the combustion of a first carbonaceous fuel;
      segregating said quantity of said captured particulate matter source compound to an ultra-fine particle size;
      establishing a quantity of calcium source compound;
      segregating said quantity of calcium source compound to an ultra-fine particle size;
      milling at least one second carbonaceous fuel in the presence of said segregated particulate matter source compound and said segregated calcium source compound to form said low emission carbonaceous fuel;
   combusting said low emission carbonaceous fuel.

2. A method of utilizing a low emission carbonaceous fuel as described in claim 1 wherein said particulate matter source compound comprises fly ash.

3. A method of utilizing a low emission carbonaceous fuel as described in claim 1 wherein said calcium source compound comprises limestone.

4. A method of utilizing a low emission carbonaceous fuel as described in claim 1 wherein said step of milling at least one second carbonaceous fuel in the presence of said segregated particulate matter source compound and said segregated calcium source compound comprises the step of distributing said segregated particulate matter source compound and said segregated calcium source compound across a surface area of said second carbonaceous fuel.

5. A method of utilizing a low emission carbonaceous fuel as described in claim 1 further comprising the step of reducing formation of NOx emissions as compared to the combustion of a non-treated carbonaceous fuel.

6. A method of utilizing a low emission carbonaceous fuel as described in claim 5 wherein said step of reducing formation of NOx emissions comprises the step of catalytically reducing formation of NOx emissions.

7. A method of utilizing a low emission carbonaceous fuel as described in claim 1 further comprising the step of reducing formation of mercury emissions compared to combustion of a non-treated carbonaceous fuel.

8. A method of utilizing a low emission carbonaceous fuel as described in claim 7 wherein said step of reducing formation of mercury emissions comprises the step of catalytically reducing formation of mercury emissions.

9. A method of utilizing a low emission carbonaceous fuel as described in claim 1 further comprising the step of reducing formation of SOx emissions compared to combustion of a non-treated carbonaceous fuel.

10. A method of utilizing a low emission carbonaceous fuel as described in claim 9 wherein said step of reducing formation of SOx emissions comprises the step of catalytically reducing formation of SOx emissions.

11. A method of utilizing a low emission carbonaceous fuel as described in claim 1 wherein said segregated quantity of said captured particulate matter source compound and said segregated quantity of said calcium source compound comprise particles equal to or less than 100 μM in size.

12. A method of utilizing a carbonaceous fuel additive comprising the steps of:
   receiving said carbonaceous fuel additive, wherein said carbonaceous fuel additive was generated by steps comprising:
      segregating a quantity of particulate matter source compound to an ultra-fine particle size;
      segregating a quantity of calcium source compound to an ultra-fine particle size;
   milling said carbonaceous fuel additive with at least one carbonaceous fuel;
   combusting said carbonaceous fuel.

13. A method of utilizing a catalytically enhanced carbonaceous feedstock comprising the steps of:
   receiving said catalytically enhanced carbonaceous feedstock, wherein said catalytically enhanced carbonaceous feedstock was generated by steps comprising:
      capturing a quantity of particulate matter source compound from the combustion of a carbonaceous fuel;
      segregating said quantity of said captured particulate matter source compound to an ultra-fine particle size;
      establishing a quantity of calcium source compound;
      segregating said quantity of calcium source compound to an ultra-fine particle size;
      milling said carbonaceous feedstock in the presence of said segregated particulate matter source compound and said segregated calcium source compound to form said catalytically enhanced carbonaceous feedstock;
   inserting said catalytically enhanced carbonaceous feedstock in a gasification reactor;
   gasifying said catalytically enhanced carbonaceous feedstock.

14. A method of utilizing a catalytically enhanced carbonaceous feedstock as described in claim 13 wherein said particulate matter source compound comprises fly ash.

15. A method of utilizing a catalytically enhanced carbonaceous feedstock as described in claim 13 wherein said calcium source compound comprises limestone.

16. A method of utilizing a catalytically enhanced carbonaceous feedstock as described in claim 13 wherein said step of milling said carbonaceous feedstock in the presence of said segregated particulate matter source compound and said segregated calcium source compound comprises the step of distributing said segregated particulate matter source compound and said segregated calcium source compound across a surface area of said carbonaceous feedstock.

17. A method of utilizing a catalytically enhanced carbonaceous feedstock as described in claim 13 wherein said step of gasifying results in catalytically reducing formation of select product gas contaminants as compared to gasification without said catalytically enhanced carbonaceous feedstock.

18. A method of utilizing a catalytically enhanced carbonaceous feedstock as described in claim 13 wherein said step of gasifying comprises the step of catalytically improving the rate of carbonaceous feedstock conversion to select product gas components thereby increasing the yield of said select product gas components as compared to gasification without said catalytically enhanced carbonaceous feedstock.

19. A method of utilizing a catalytically enhanced carbonaceous feedstock as described in claim 13 and further comprising the step of partially combusting a portion of said catalytically enhanced carbonaceous feedstock.

20. A method of utilizing a catalytically enhanced carbonaceous feedstock as described in claim 13 and further comprising a step selected from the group consisting of catalytically reducing formation of NOx emissions as compared to gasification of a non-treated carbonaceous feedstock, catalytically reducing formation of mercury emissions as compared to gasification of a non-treated carbonaceous feedstock, and catalytically reducing formation of sulfur emissions as compared to gasification of a non-treated carbonaceous feedstock.

21. A method of utilizing a catalytically enhanced carbonaceous feedstock as described in claim 13 wherein said carbonaceous feedstock comprises at least one carbonaceous feedstock selected from the group consisting of: coal; bituminous; anthracite; subbituminous; lignite; liquefied coal; petroleum coke; biomass; petroleum; peat; residual oils; natural gas; pulverized coal; waste-derived feedstocks; wood pellets; wood chips; waste wood; plastic; aluminum; municipal solid waste (MSW); refuse-derived fuel (RDF); agricultural and industrial waste; sewage sludge; switch grass; seed corn; corn stover; and crop residues.

22. A method of utilizing a carbonaceous feedstock catalytic additive comprising the steps of:
receiving said carbonaceous feedstock catalytic additive, wherein said carbonaceous feedstock catalytic additive was generated by steps comprising:
segregating a quantity of particulate matter source compound to an ultra-fine particle size;
segregating a quantity of calcium source compound to an ultra-fine particle size;
milling said carbonaceous feedstock catalytic additive with at least one carbonaceous feedstock to form a catalytically enhanced carbonaceous feedstock;
inserting said catalytically enhanced carbonaceous feedstock in a gasification reactor;
gasifying said catalytically enhanced carbonaceous feedstock.

\* \* \* \* \*